(12) United States Patent
Balu et al.

(10) Patent No.: US 7,766,483 B2
(45) Date of Patent: Aug. 3, 2010

(54) OPTICAL PROJECTION SYSTEM AND METHODS FOR CONFIGURING THE SAME

(76) Inventors: Suresh Balu, 102 Charlesberry Cir., Chapel Hill, NC (US) 27517; Jason Coposky, 815 W. Johnson St., Apt. A, Raleigh, NC (US) 27605; Ray Idaszak, 1001 Napa Pl., Apex, NC (US) 27502; Warren Ginn, 4257 The Oaks Dr., Raleigh, NC (US) 27606; Tim Fletcher, Tin On Industrial Building, 779-9 Cheung Sha Wan Road, Kowloon, Flat A, 2/F, Block A (HK)

( * ) Notice: Subject to any disclaimer, the term of this patent is extended or adjusted under 35 U.S.C. 154(b) by 1092 days.

(21) Appl. No.: 11/398,228

(22) Filed: Apr. 5, 2006

(65) Prior Publication Data

US 2006/0227416 A1 Oct. 12, 2006

Related U.S. Application Data

(60) Provisional application No. 60/668,721, filed on Apr. 6, 2005.

(51) Int. Cl.
*G03B 21/00* (2006.01)
*G03B 21/28* (2006.01)
*G09B 9/00* (2006.01)

(52) U.S. Cl. .................. 353/7; 353/99; 348/121

(58) Field of Classification Search ............ 353/69, 353/70, 98, 99, 7; 348/51, 121; 359/451, 359/462, 863, 864

See application file for complete search history.

(56) References Cited

U.S. PATENT DOCUMENTS

| 2,299,682 | A | | 10/1942 | Conant |
| 2,510,080 | A | | 6/1950 | Cueno |
| 4,464,029 | A | * | 8/1984 | Jaulmes ............. 352/69 |

(Continued)

FOREIGN PATENT DOCUMENTS

EP 0836169 A1 9/2005

(Continued)

OTHER PUBLICATIONS

International Search Report for PCT/US06/13022; Apr. 30, 2007.

(Continued)

*Primary Examiner*—Georgia Y Epps
*Assistant Examiner*—Ryan Howard
(74) *Attorney, Agent, or Firm*—Myers Bigel Sibley & Sajovec, PA

(57) ABSTRACT

An optical projection system for use with a display surface includes at least one image source including an array of source image pixels, a projector to project a first projection of the array of source image pixels, and at least one mirror including at least one curved reflecting surface having a curved profile. The at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels.

29 Claims, 6 Drawing Sheets

U.S. PATENT DOCUMENTS

| | | | |
|---|---|---|---|
| 4,500,163 A | 2/1985 | Burns et al. | |
| 4,656,506 A | 4/1987 | Ritchey | |
| 4,725,106 A | 2/1988 | Shields et al. | |
| 5,004,331 A | 4/1991 | Haseltine et al. | |
| 5,011,263 A | 4/1991 | Hopper | |
| 5,394,198 A | 2/1995 | Janow | |
| 5,500,747 A | 3/1996 | Tanide et al. | |
| 5,502,481 A | 3/1996 | Dentinger et al. | |
| 5,611,174 A | 3/1997 | Hayashi | |
| 5,724,775 A | 3/1998 | Zobel, Jr. et al. | |
| 5,746,599 A | 5/1998 | Lechner | |
| 5,762,413 A | 6/1998 | Colucci et al. | |
| 6,034,717 A | 3/2000 | Dentinger et al. | |
| 6,104,405 A | 8/2000 | Idaszak et al. | |
| 6,188,517 B1 | 2/2001 | Neff et al. | |
| 6,231,189 B1 | 5/2001 | Colucci et al. | |
| 6,327,020 B1 * | 12/2001 | Iwata | 352/69 |
| 6,409,351 B1 | 6/2002 | Ligon | |
| 6,424,464 B1 | 7/2002 | Neff et al. | |
| 6,530,667 B1 | 3/2003 | Idaszak et al. | |
| 6,554,434 B2 | 4/2003 | Sciammarella et al. | |
| 6,578,971 B1 | 6/2003 | Neff | |
| 6,712,477 B2 | 3/2004 | Idaszak et al. | |
| 6,735,015 B1 | 5/2004 | Blackham | |
| 6,865,023 B2 * | 3/2005 | Shafer | 359/445 |
| 6,871,958 B2 * | 3/2005 | Streid et al. | 353/37 |
| 6,986,586 B2 * | 1/2006 | Martinez, Sr. | 359/847 |
| 7,111,943 B2 * | 9/2006 | Agostinelli et al. | 353/79 |
| 2002/0149752 A1 * | 10/2002 | Courchesne | 353/122 |
| 2004/0141157 A1 * | 7/2004 | Ramachandran et al. | 353/70 |

FOREIGN PATENT DOCUMENTS

| | | |
|---|---|---|
| JP | 07080096 A | 3/1995 |
| JP | 08334845 A | 12/1996 |
| WO | WO 98/25179 A2 | 6/1998 |
| WO | WO 98/38599 A1 | 9/1998 |
| WO | WO 02/079858 A2 | 10/2002 |

OTHER PUBLICATIONS

Matsushita Electric Works, Ltd. "Press Release—MEW to Launch CyberDome, a hemispherical 3-D image display system with a wide variety of applications in spatial design, product design, simulator, amusement, etc." Jan. 4, 2004 http://www.mew.co.jp/e-press/0204_0206/0212-03.htm.

* cited by examiner

OPTICAL PROJECTION SYSTEM AND METHODS FOR CONFIGURING THE SAME

RELATED APPLICATION

The present invention claims the benefit of and priority to U.S. Provisional Patent Application Ser. No. 60/668,721, filed Apr. 6, 2005, the disclosure of which is incorporated herein by reference in its entirety.

FIELD OF THE INVENTION

The present invention relates to optical projection systems and, more particularly, to optical projection systems for projecting an array of image pixels.

BACKGROUND OF THE INVENTION

Hemispherical optical projection systems and methods are used to project images onto the inner surfaces of domes. Hemispherical optical projection systems and methods have long been used in planetariums, commercial and military flight simulators and hemispherical theaters such as OMNIMAX® theaters. With the present interest in virtual reality, hemispherical optical projection systems and methods have been investigated for projecting images which simulate a real environment. Such images are typically computer-generated multimedia images including video, but they may also be generated using film or other media. Home theater has also generated much interest, and hemispherical optical projection systems and methods are also being investigated for home theater applications.

Hemispherical optical projection systems and methods have typically required elaborate color correction and spatial correction of the image to be projected, so as to be able to project a high quality image over a hemisphere. Elumens Corporation has developed and offered optical projection systems that employ a constant angular separation hemispherical optical projection system to address these and other problems. However, such lens assemblies may require substantial and burdensome costs and design efforts, and may suffer from limited flexibility and other drawbacks in some applications.

SUMMARY OF THE INVENTION

According to embodiments of the present invention, an optical projection system for use with a display surface includes at least one image source comprising an array of source image pixels, a projector to project a first projection of the array of source image pixels, and at least one mirror including at least one curved reflecting surface having a curved profile. The at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels.

According to method embodiments of the present invention, a method for determining a profile for at least one curved reflecting surface of at least one mirror of an optical projection system for use with a display surface, the optical projection system further including at least one image source comprising an array of source image pixels and a projector to project a first projection of the array of source image pixels, includes computationally determining a profile of at least one reflecting surface providing a desired beam placement, image focus, and beam grazing angle, wherein the at least one reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels.

According to embodiments of the present invention, an optical projection system for use with a display surface includes at least one image source comprising an array of source image pixels, a projector to project a first projection of the array of source image pixels, and at least one mirror including at least one curved reflecting surface having a curved profile. The at least one curved reflecting surface is adapted to convert the first projection to a curved second projection directed onto the display surface to provide an array of displayed image pixels on the display surface corresponding to the array of source image pixels, wherein the array of displayed image pixels are distributed on the display surface such that reference rays each cast from a defined common reference point to a center of a respective one of the displayed pixels will have constant angular separation between adjacent said reference rays.

According to further method embodiments of the present invention, a method for determining a profile for at least one curved reflecting surface of at least one mirror of an optical projection system for use with a display surface, the optical projection system further including at least one image source comprising an array of source image pixels and a projector to project a first projection of the array of source image pixels, includes computationally determining a profile of at least one reflecting surface providing a desired beam placement, image focus, and beam grazing angle, wherein the at least one reflecting surface is adapted to convert the first projection to a curved second projection directed onto the display surface to provide an array of displayed image pixels on the display surface corresponding to the array of source image pixels, wherein the array of displayed image pixels are distributed on the display surface such that reference rays each cast from a defined common reference point to a center of a respective one of the displayed pixels will have constant angular separation between adjacent said reference rays.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
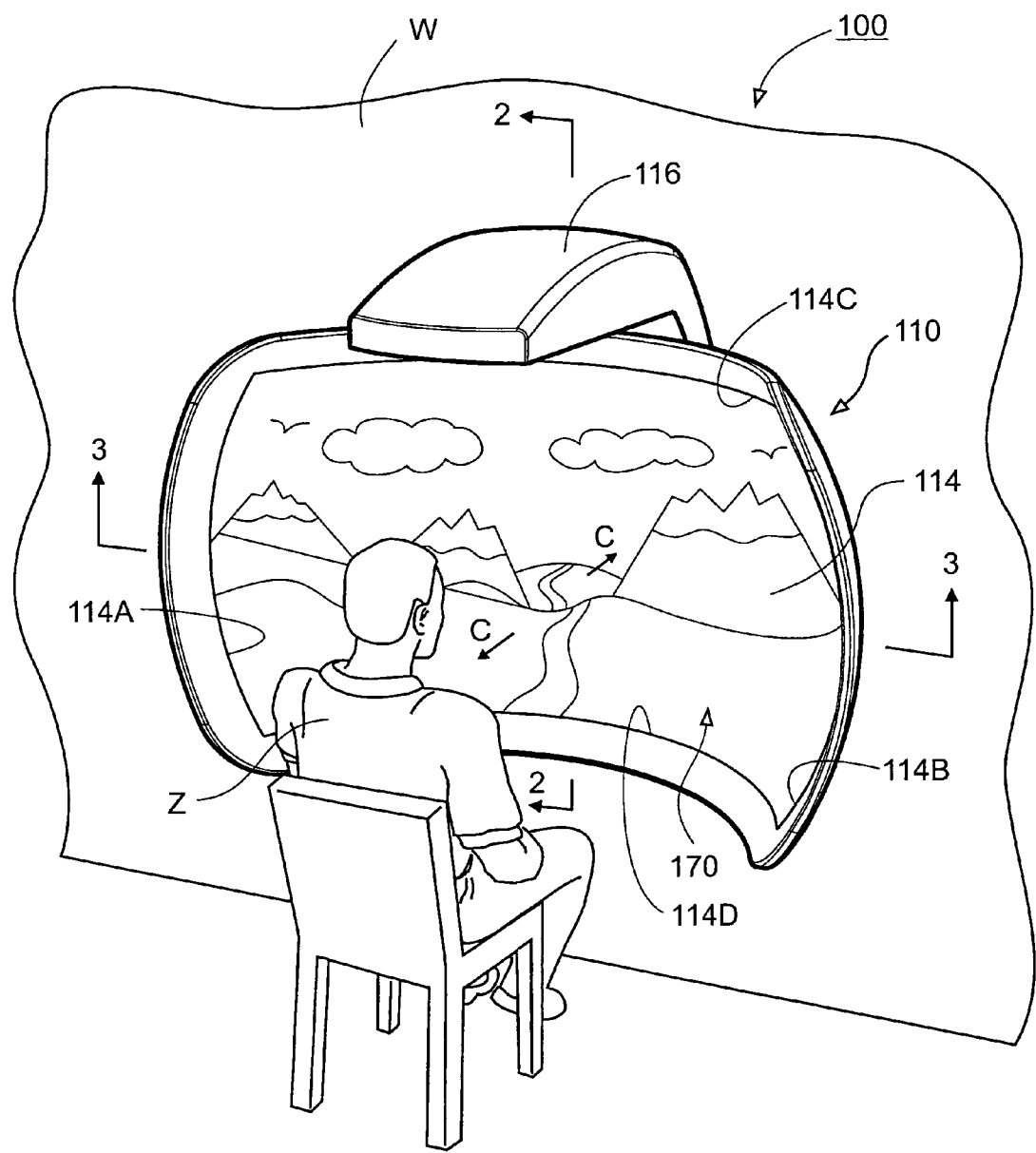
FIG. 1 is a front, perspective view of an optical projection system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, in the case of an array of pixels displayed on a non-planar display surface, "pixel pitch" refers to the arc length pixel pitch measured along the curvature of the display surface.

With reference to FIGS. 1-4, an optical projection system 100 according to embodiments of the present invention is shown therein. The optical projection system 100 includes a display structure 110, a projection system 120 (FIG. 4), and a curved projection reflector or mirror 150 having a curved reflecting surface 152. The optical projection system 100 is adapted to project a curved projection 162 onto a display surface 114 of the display structure 110 as a displayed image 170. As shown in FIG. 1, the optical projection system 100 can be mounted on a wall W or otherwise supported and positioned so that a viewer or viewers Z may watch the displayed image 170 on the display surface 114. The optical projection system 100 may provide the viewer Z with an enhanced or immersive visual experience. The components and operation of the optical projection system 100 will be described in more detail below. It will be appreciated that the various aspects of the present invention are not limited to the illustrated embodiments.

The display structure 110 may be secured to the wall W by a mount bracket 112 (FIG. 2) or the like. Alternatively, the display structure 110 may be mounted on a stand or a support surface (e.g., a table), or supported in any other suitable manner. The display structure 110 may be formed of any suitable material such as a polymeric material (e.g., acrylic or ABS), composite, metal or other suitable rigid, lightweight material, or any combination thereof.

The display surface 114 is defined by opposed top and bottom edges 114A and 114B (which may be substantially parallel) and opposed side edges 114C and 114D (which may be curved, mirror images of one another). The display surface 114 is adapted to reflect incident light for display of projections to the viewer Z. Although the display surface 114 may be white, according to some embodiments, the display surface 114 is tinted or coated with a layer of a substantially opaque paint. The display surface 114 may also be formed of a retroreflective and/or polarization preserving material.

According to some embodiments and as shown, the display surface 114 has a curved profile. According to some embodiments, the display surface 114 has a truncated ellipsoidal shape. According to some embodiments, the display surface 114 has a truncated spherical shape. According to some embodiments, the display surface 114 has the shape of a truncated ellipsoid (e.g., a hemisphere or other truncated sphere) that is truncated on opposed sides (e.g., top and bottom sides and/or opposed lateral or vertical sides). For example, the display surface 114 as illustrated is truncated on its top and bottom sides (i.e., to form the edges 114A, 114B) and on its lateral sides (i.e., to form the edges 114C, 114D). According to some embodiments, the display surface 114 is truncated cylindrically shaped (i.e., shaped as a curved section of a cylinder wherein the section plane extends transverse to the base plane of the cylinder). The display surface 114 has a center axis C-C (FIG. 1). According to some embodiments, the display surface 114 has a width of between about 4 feet and 7 feet and a height of between about 2.25 feet and 5.25 feet.

The projector system 120 (FIG. 4) includes an image signal source such as a video source 122 (e.g., computer, game console or DVD player), suitable electronics 124 adapted to receive, interpret and/or convert signals from the video source 122, an image source 126 and an optics assembly 128.

The image source 126 may be an image plate or any other suitable image source the resolution of which is defined by a limiting unit area. The term "pixel" as used herein refers to any such unit area. The image source includes an array of source image pixels. According to some embodiments, the array of pixels is a two-dimensional array of pixels. However, according to other embodiments, the array may be a one-dimensional array (i.e., 1×(n)). According to some embodiments, the image source 126 includes an array of defined image pixels, for example, as may be provided by a liquid crystal display (LCD). Alternatively or additionally, the image source 126 may include a digital light processing device (DLP), liquid crystal on silicon device (LCOS), laser-based pixel array device, cathode ray tube (CRT), or any other suitable image array source.

The optics assembly 128 is configured and positioned to project the image from the image source 126 as a first projection 160 including the array of image pixels thereof. The optics assembly 128 may be any suitable combination of optics and the like. According to some embodiments, the optics assembly 128 includes glass and/or plastic optical elements and an aluminum lens barrel and has a terminal lens 128A. The optics assembly 128 may project the array of image pixels in the projection 160 in accordance with any suitable function or distribution. According to some embodiments, the optics assembly 128 projects the array of image pixels of the projection 160 in a f*tan(θ) or linear distribution.

According to some embodiments, the electronics 124, the image source 126 and the optics assembly 128 are mounted in a shared housing 125 to form a projector unit 121 that is mounted on or integral with the display structure 110 as shown. The projector unit 121 may be a suitable unmodified or modified commercially available projector unit such as a JVC HD2K, Epson Cinema 800, or InFocus LP70.

The curved mirror 150 is mounted on a mirror support or arm 116 that extends forwardly from the display structure 110. The arm 116 may be configured as a hood to hide the mirror 150, the projector unit 121 and/or other components of the optical projection system 100 from the viewer Z.

The mirror 150 may be formed of any suitable construction and using any suitable method. According to some embodiments, the mirror 150 includes a body 154 formed of a polymeric material and a layer or coating 155 of an optical quality visible light reflective material (e.g., aluminum or silver) forming the curved reflecting surface 152. The body 154 may be molded, cast and/or machined (e.g., using CNC processing) to provide the desired profile for the reflecting surface 152. Other suitable materials for the body 154 may include glass or metal (e.g., aluminum).

Figure 2:
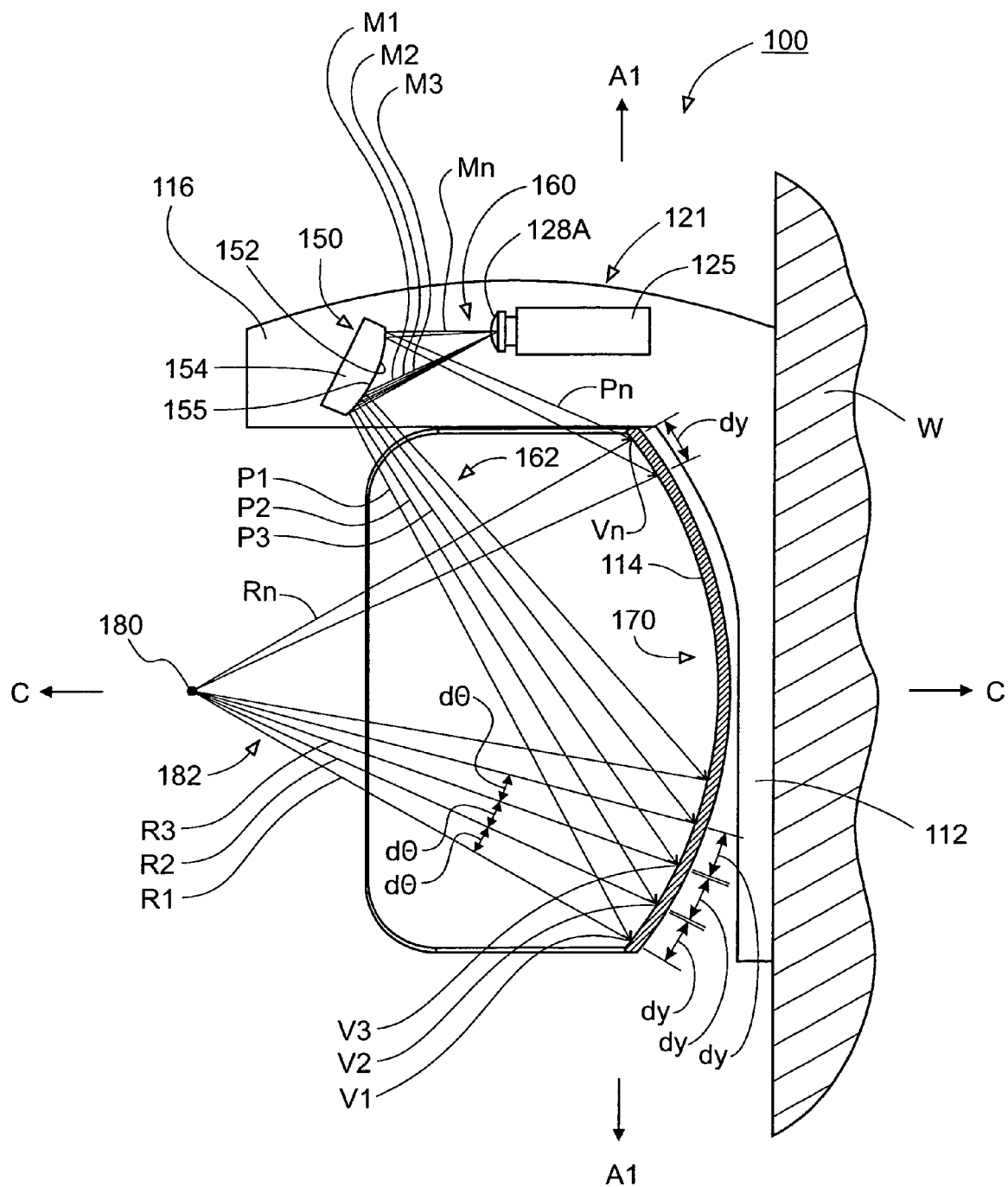
FIG. 2 is a fragmentary, cross-sectional view of the optical projection system of FIG. 1 taken along the line 2-2 of FIG. 1.

With reference to FIG. 2, the optical projection system 100 may be used as follows to project an image onto the display surface 114. The video source 122 generates a signal representing the array of image pixels, which signal is converted to an array of source image pixels on the image source 126. The array of source image pixels is projected by the projector system 120 via the optics assembly 128 as a first or primary beam or projection 160. The primary projection 160 includes pixel beams corresponding to the array of source image pixels and is directed onto the curved reflecting surface 152 of the mirror 150. The reflecting surface 152 converts the primary projection 160 into a second or secondary projection 162, which is directed by the reflecting surface 152 onto the display surface 114. The projection 162 is a curved projection and includes pixel beams corresponding to the array of source image pixels from the image source 126. The pixel beams of the projection 162 are incident on the display surface 114 so as to form an array of displayed image pixels that form the displayed image 170. That is, the displayed image pixels are the image pixels that are viewable by the viewer Z by observing the display surface 114 as the displayed image 170. The pixel beams of the projection 162 are redistributed by the reflecting surface 152 as compared to the corresponding pixel beams of the projection 160 so that the displayed image pixels are distributed on the display surface as an array of displayed image pixels having uniform or constant pixel pitch between adjacent displayed image pixels.

The foregoing method and apparatus for projecting may reduce or eliminate unnatural distortion of the image on the curved display surface 114. In particular, when the reflecting surface 152 is properly formed and positioned relative to the primary projection beam 160 and the display surface 114, the pixel pitch between image pixels incident on the display surface 114 from the projection 162 may be maintained constant and thereby eliminate the need for distortion correction. According to some embodiments and as discussed in more detail below, the displayed image 170 has both constant vertical pixel pitch between adjacent displayed image pixels and constant horizontal pixel pitch between adjacent displayed image pixels.

The mirror 150 also decreases the overall focal length of the system, thereby creating an infinite depth of field. Accordingly, the same mirror 150 can be used across a wide range of display surface sizes. When combined with a constant pixel pitch between adjacent displayed pixels, the same optical projection system may be used with a wide range of different sizes of display structures and display surfaces.

Turning to the primary projection 160, the secondary projection 162 and the conversion therebetween in more detail and with reference to FIG. 2 (which is a vertical cross-section of the optical projection system 100), the projection 160 is schematically illustrated as having exemplary adjacent image pixel beams M1, M2, M3 . . . Mn from the array of source image pixels from the image source 126. The image pixel beams M1, M2, M3 . . . Mn are converted and redirected by the curved reflecting surface 152 as corresponding adjacent image pixel beams P1, P2, P3 . . . Pn, respectively. The image pixel beams P1, P2, P3 . . . Pn strike the display surface to provide corresponding adjacent displayed image pixels V1, V2, V3 . . . Vn, which form, in part, the displayed image 170. The displayed image pixels V1, V2, V3 . . . Vn have constant vertical pixel pitch among adjacent displayed image pixels V1, V2, V3 . . . Vn as indicated by the distances dy (i.e., the arc lengths between the pixels V1, V2, V3 . . . Vn extending generally vertically along the curved surface of the display surface 114; FIG. 2) between adjacent displayed image pixels V1, V2, V3 . . . Vn on the display surface 114.

Figure 3:
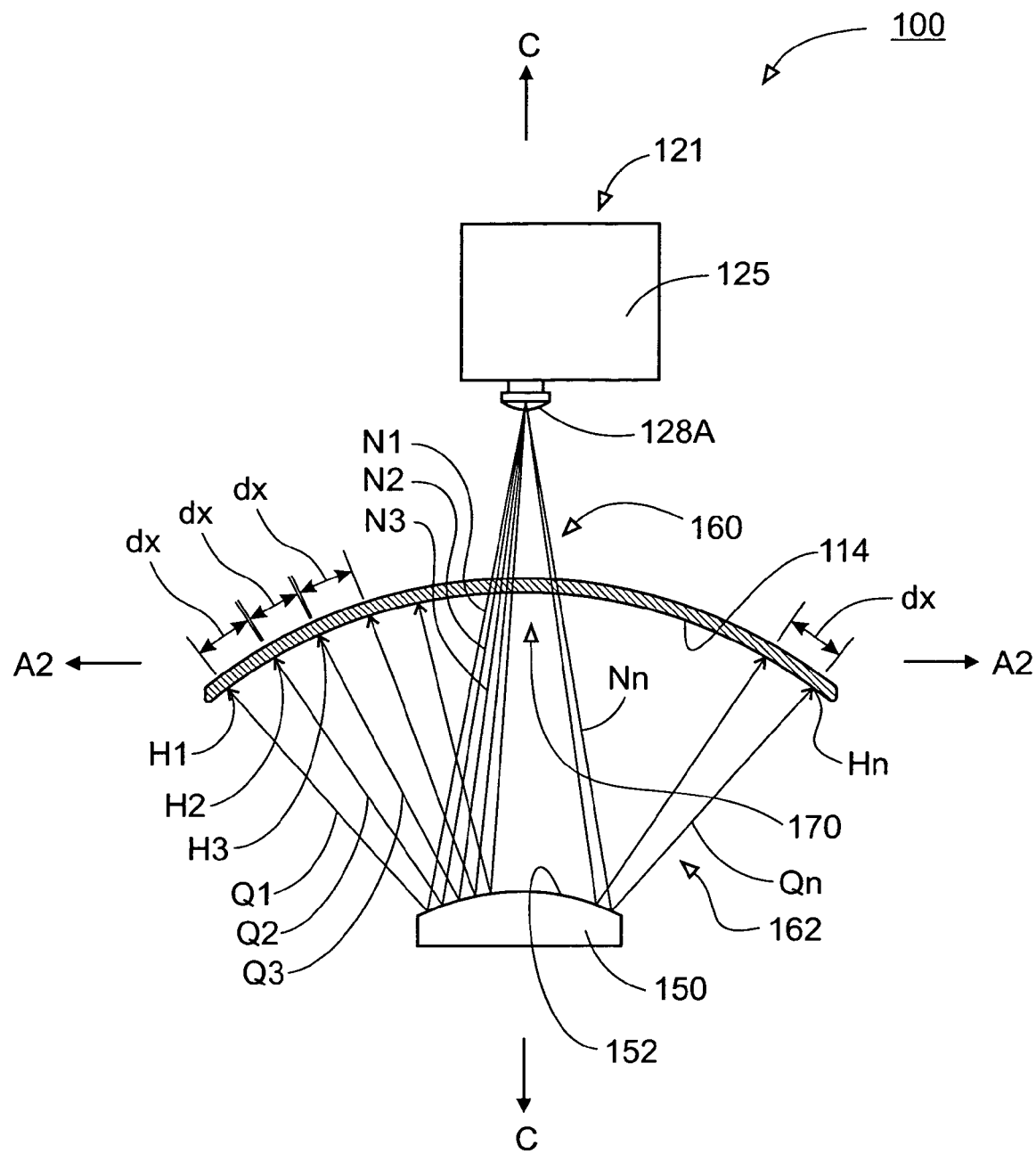
FIG. 3 is a fragmentary, cross-sectional view of the optical projection system of FIG. 1 taken along the line 3-3 of FIG. 1.
Figure 4:
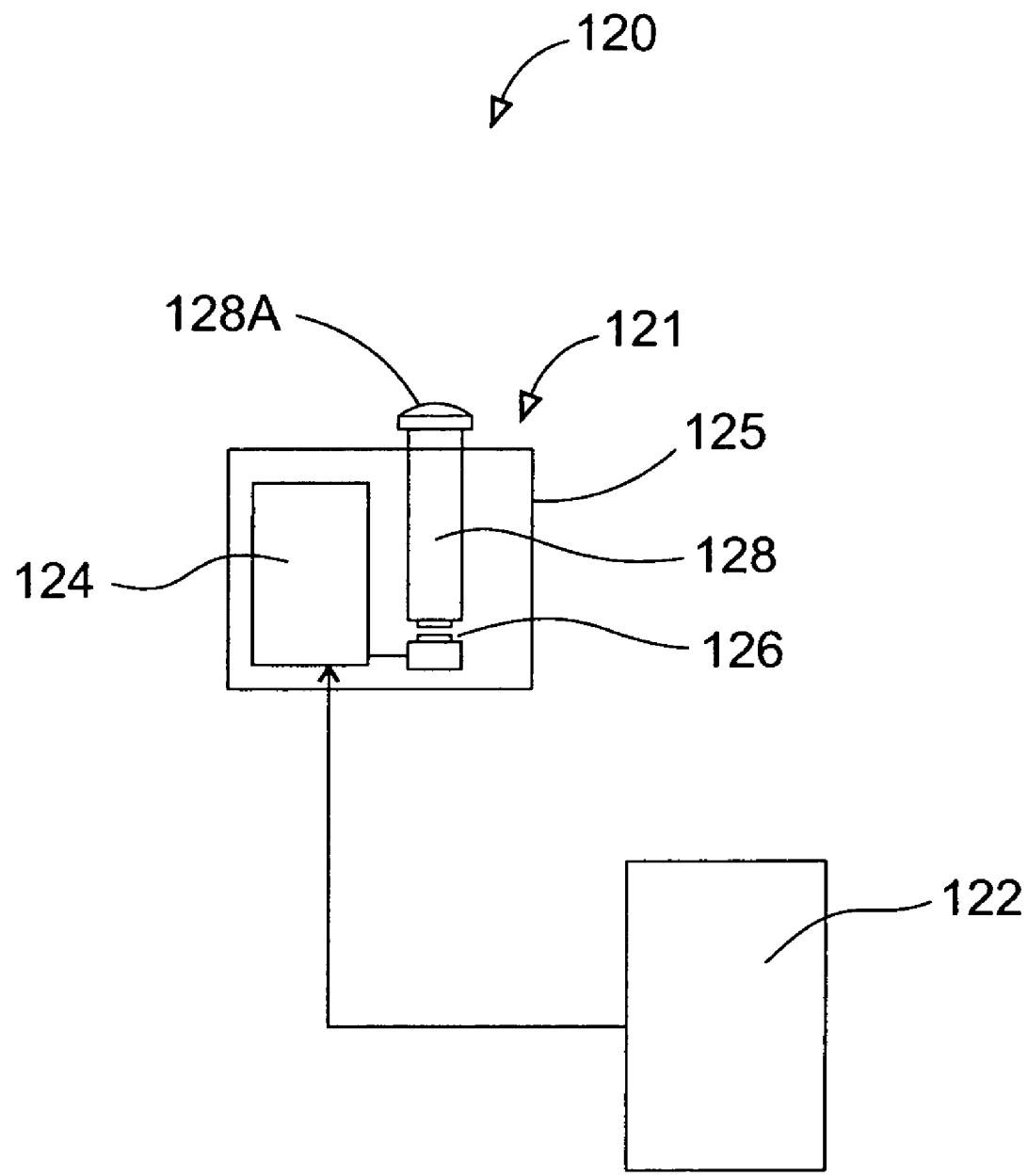
FIG. 4 is a schematic block diagram representing a projector system forming a part of the optical projection system of FIG. 1.

As shown in FIG. 2, the projected image 170 has constant vertical pixel pitch dy among adjacent image pixels along the vertical planes or axes (i.e., the vertical axis A1-A1 shown in FIG. 2 and the other vertical axes of the projected image array, which are parallel to the illustrated vertical axis A1-A1). According to some embodiments, the projected image 170 likewise has constant horizontal pixel pitch among adjacent image pixels along the transverse or horizontal planes or axes (i.e., the horizontal axis A2-A2 shown in FIG. 3 and the other horizontal axes of the projected image array, which are parallel to the illustrated horizontal axis A2-A2). More particularly, the projection 160 has image pixel beams N1, N2, N3 . . . Nn that are converted to corresponding image pixel beams Q1, Q2, Q3 . . . Qn in the projection 162. The image pixel beams Q1, Q2, Q3 . . . Qn strike the display surface 114 to provide corresponding adjacent displayed image pixels H1, H2, H3 . . . Hn, which form, in part, the displayed image 170. The displayed image pixels H1, H2, H3 . . . Hn have constant horizontal pixel pitch among adjacent displayed image pixels H1, H2, H3 . . . Hn along the horizontal axis A2-A2 as indicated by the distances dx (i.e., the arc lengths between the pixels H1, H2, H3 . . . Hn extending generally horizontally along the curved surface of the display surface 114; FIG. 3) between adjacent displayed image pixels H1, H2, H3 . . . Hn.

According to some embodiments, the vertical arc length of separation dy of the displayed pixels is the same as the horizontal arc length of separation dx of the displayed pixels. According to some embodiments, the vertical arc length of separation dy of the displayed pixels is the different from the horizontal arc length of separation dx of the displayed pixels.

According to some embodiments, the vertical arc length of separation dy and the horizontal arc length of separation dx of the displayed pixels are increased in the same proportions relative to the vertical and horizontal pixel pitches of the array of source pixels from the image source 126. For example, the array of source image pixels 126 may be a rectangular 4:3 aspect ratio array having constant horizontal pixel pitch and constant vertical pixel pitch. The array of source image pixels may be projected in the projection 162 such that the horizontal and vertical pixel pitches are increased in the same proportions relative to the corresponding pixel pitches of the source image so that the displayed image is an enlarged rectangular 4:3 aspect ratio array, thereby maintaining the aspect ratio of the source array.

According to some embodiments, the vertical arc length of separation dy and the horizontal arc length of separation dx of the displayed pixels are increased in different proportions relative to the corresponding vertical and horizontal pixel pitches of the source array of source pixels from the image source 126. This approach may be employed to convert or change an aspect ratio of the source pixel array from the image source 126 to a different aspect ratio in the resulting displayed image 170. By way of example, the array of source image pixels of the image source 126 may be a rectangular 4:3 aspect ratio array having a constant horizontal pitch and a constant vertical pixel pitch. The array of source image pixels may be projected in the projection 162 such that, in the displayed image 170, the horizontal pixel pitch dx is increased relative to the source array by a greater factor than the vertical pixel pitch dy. According to some embodiments, the source array is converted to a 16:9 aspect ratio in the displayed image 170.

Thus, the optical projection system 100 including the reflecting surface 152 may be said to perform as or emulate an inverse telephoto system having infinite focus along the vertical axes and the horizontal axes. The reflecting surface 152 may be regarded as an active optical element because it typically alters the optical properties of the projector system 120 from not having infinite focus to having infinite focus and may also change the distribution of pixels to have different but constant horizontal and vertical constant pixel pitches.

According to some embodiments, the projection 162 is a truncated ellipsoidal projection. According to some embodiments, the projection 162 is a truncated spherical projection. According to some embodiments, the projection 162 is a truncated cylindrical projection.

According to some embodiments, the projection 162 has a sweep in at least one plane of at least about 90 degrees and, according to some embodiments, between about 120 and 180 degrees. According to some embodiments, the horizontal sweep of the projection 162 is greater than the vertical sweep thereof in a ratio of 4:3 or 16:9.

The conversion of the primary projection 160 to the secondary projection 162 is accomplished by properly shaping the curvature of the reflecting surface 152. According to some embodiments, the reflecting surface 152 is convex as shown. According to some embodiments, the reflecting surface is concave. According to some embodiments, the reflecting surface 152 conforms to an asymmetric smooth manifold.

Any suitable method may be used to determine the proper curved shape or profile for the reflecting surface 152. The method for determining the profile of the reflecting surface 152 may include computationally determining (e.g., using suitable computer software) a profile of at least one reflecting surface that provides a desired beam placement, image focus, and beam grazing angle. The profile may be computationally determined using one or more numerical optimization methods and/or one or more search methods (which may include linear or non-linear search techniques) for determining the at least one reflecting surface profile that provides desired (and, according to some embodiments, substantially optimal) projected beam placement, image focus and beam grazing angles. According to some embodiments, a method for determining the mirror shape includes using a model to inverse-ray trace from the display surface 114 to the optics assembly 128 as the source of the array of image pixels (for example, using suitable computer software). The method may include performing (e.g., using computer software) surface optimization and regression until, within the model, the reflecting surface 152 converts the primary projection 160 to the prescribed secondary projection 162. The source of the array of image pixels may be defined as points distributed on the display surface 114 representing an array of displayed image pixels having uniform or constant pixel pitch between adjacent displayed image pixels.

According to some embodiments, the system 100 is configured such that reference rays each cast from a defined common reference point to the center of a respective one of the displayed pixels will have constant angular separation between adjacent said reference rays. For example, with reference to FIG. 2, a common reference point 180 is defined. Reference rays R1, R2, R3 . . . Rn (which may be mathematical constructs; collectively indicated by the numeral 182) extend from the reference point 180 and connect the reference point 180 to the centers of the displayed image pixels V1, V2, V3 . . . Vn, respectively. Thus, the reference rays R1, R2, R3 . . . Rn correspond to pixel beams P1, P2, P3 . . . Pn, respectively, and to pixel beams M1, M2, M3 . . . Mn, respectively. The reference rays R1, R2, R3 . . . Rn have constant angular separation (i.e., equiangular separation) among adjacent ones of the reference rays R1, R2, R3 . . . Rn as indicated by the angle dθ.

While the foregoing feature of constant angular separation among adjacent reference rays is described with reference to the displayed image pixels V1, V2, V3 . . . Vn along the vertical planes or axes (e.g., the axis A1-A1), such constant angular separation may alternatively or additionally be provided along the horizontal axes (e.g., the axis A2-A2). The constant angle of separation dθ between adjacent reference rays on the vertical axes or planes may be the same as the constant angle of separation between adjacent reference rays on the horizontal axes or planes. According to some embodiments, the vertical constant angle of separation is different from the horizontal angle of separation.

According to some embodiments, the system 100 displays the array of source image pixels such that the constant angle of separation between reference rays along the horizontal axes is increased by a greater factor relative to the horizontal pitch of the array of source image pixels from the image source 126 than is the constant angle of separation between reference rays along the vertical axes relative to the vertical pitch of the array of source image pixels from the image source 126. For example, the source array may be converted from a 4:3 aspect ratio to a 16:9 aspect ratio in the displayed image 170.

Various other features, components and aspects as described herein may be employed with a constant angular separation between adjacent reference rays configuration as described. For example, the foregoing feature of constant angular separation among adjacent reference rays may likewise be incorporated into embodiments of the present invention employing multiple mirrors such as the systems 200, 300 described herein.

In order to configure a system in accordance with the present invention (e.g., the system 100) to provide constant angular separation between reference rays as described above, the profile of the reflecting surface 152 may be determined in the manner described above. In this case, the source of the array of image pixels may be defined as pixel points distributed on the display surface such that reference rays each extending from a defined common reference point (e.g., the reference point 180) to a respective one of said pixel points such that the reference rays have constant angular separation (i.e., equiangular separation) between adjacent said reference rays.

Figure 5:
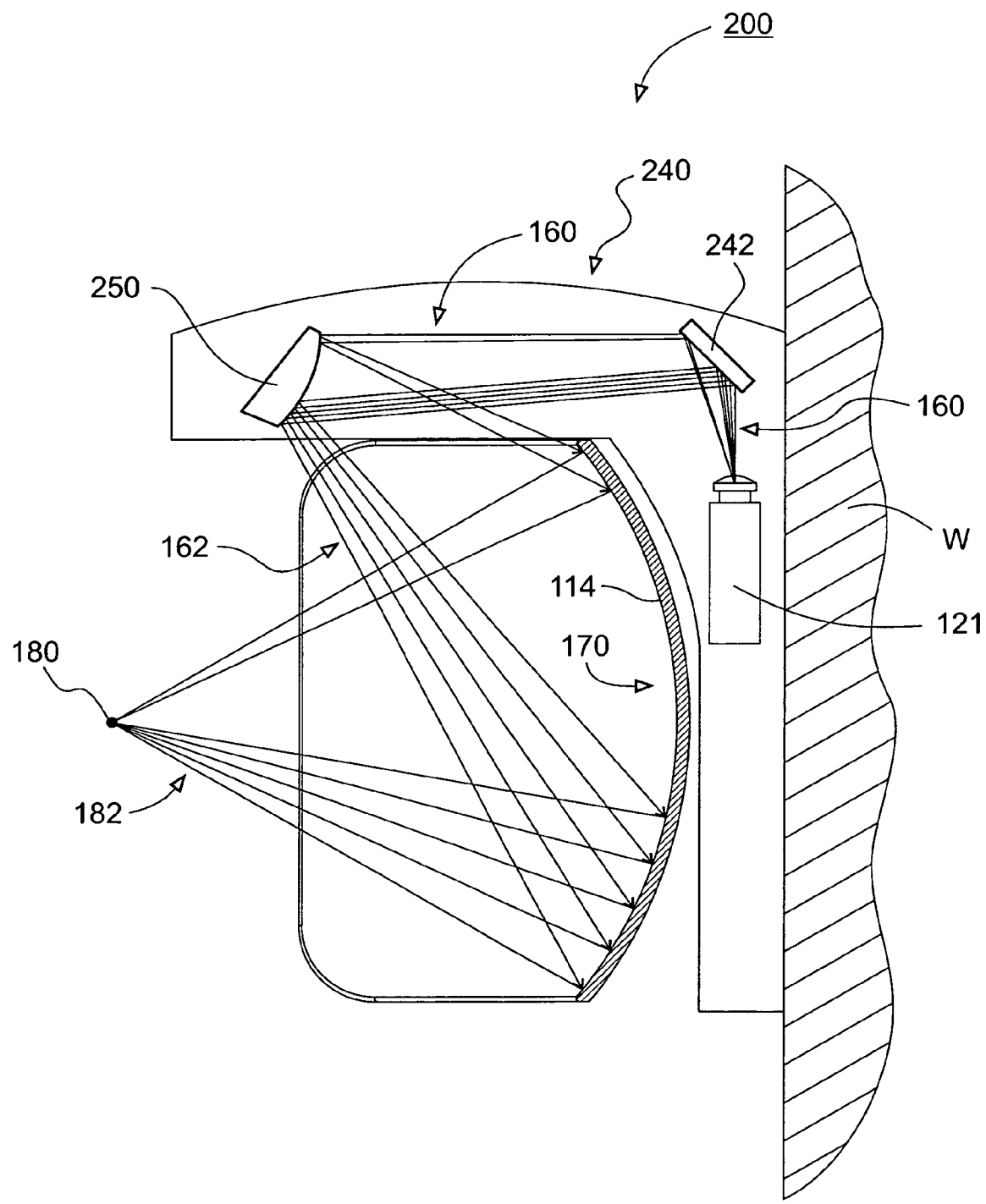
FIG. 5 is a fragmentary, cross-sectional view of an optical projection system according to further embodiments of the present invention.

With reference to FIG. 5, an optical projection system 200 according to further embodiments of the present invention is shown therein. The optical projection system 200 corresponds to the optical projection system 100, except as follows. The optical projection system 200 includes a mirror system 240 including a flat mirror 242 and a curved mirror 250 corresponding to the curved mirror 150. The mirrors 240, 250 are arranged in series along the path of light from the projector unit 121 to the display surface 114. The optical projection system 200 is configured such that the primary projection 160 from the projector unit 121 is directed onto the flat mirror 242, which in turn directs the projection 160 onto the curved mirror 250. The curved mirror 250 converts the projection 160 to the curved projection 162, which is directed onto the display surface 114 as discussed above to provide displayed image pixels (e.g., the displayed image pixels V1, V2, V3 . . . Vn) of the displayed image 170 having constant pitch among adjacent image pixels. According to some embodiments, the displayed image pixels have both constant horizontal pitch and constant vertical pitch as discussed above.

Figure 6:
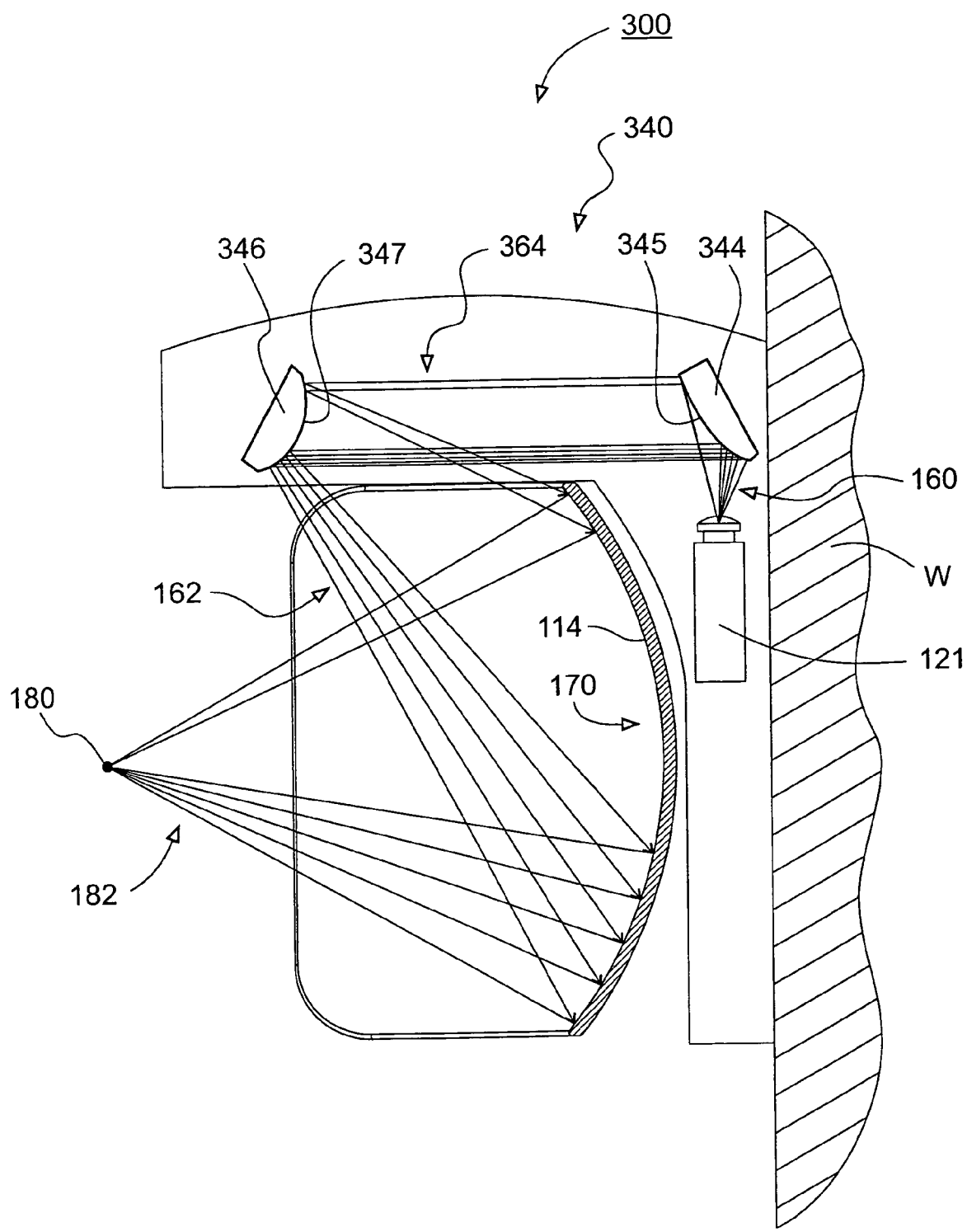
FIG. 6 is a fragmentary, cross-sectional view of an optical projection system according to further embodiments of the present invention.

With reference to FIG. 6, an optical projection system 300 according to further embodiments of the present invention is shown therein. The optical projection system 300 corresponds to the optical projection system 100 except as follows. The optical projection system 300 includes a mirror system 340 including a first curved mirror 344 and a second curved mirror 346. The mirrors 344, 346 are arranged in series along the path of light from the projector unit 121 to the display surface 114. The primary projection 160 is projected by the projector unit 121 onto a curved reflecting surface 345 of the mirror 344. The curved reflecting surface 345 conditions or converts the primary projection 160 to a secondary projection 364 of the array of image pixels wherein the image pixels have a different distribution than the projection 160. The secondary projection 364 is directed onto a curved reflecting surface 347 of the mirror 346, which converts the secondary projection 364 to the curved projection 162, which is directed onto the display surface 114. Thus, the mirrors 344 and 346 collectively or in combination perform the conversion of the projection 160 from the projector unit 121 to the curved projection 162, which is directed onto the display surface 114 as discussed above to provide displayed image pixels (e.g., the displayed image pixels V1, V2, V3 . . . Vn) having constant pitch among adjacent image pixels. According to some embodiments, the displayed image pixels have both constant horizontal pitch and constant vertical pitch as discussed above.

While the optical projection systems 200, 300 employ only two mirrors each, additional flat and/or curved mirrors may be employed.

According to some embodiments, the curved projection 162 has a substantially the same shape as the receiving display surface (e.g., the display surface 114). For example, if the curved projection 162 is a truncated hemispherical projection, the display surface 114 has a truncated hemispherically shaped. According to some embodiments, the display surface is non-truncated ellipsoidal, non-linear shaped. For example, the display surface may have a sinusoidal profile.

Optical projection systems according to embodiments of the present invention may provide a number of advantages. Optical projection systems of the present invention may emulate or mimic an optical projection system including a lens or lenses specially adapted to provide constant angular separation among pixels such as a hemispherical optical projection system as described in U.S. Pat. No. 5,762,413 to Colucci et al. However, the optical projection system of the present invention may provide various advantages or overcome certain drawbacks of such systems relying on a specially adapted lens.

As discussed above, the curved mirrors (e.g., mirrors 150, 250, 344, 346) may be constructed from a polymeric or other relatively inexpensive suitable material that is coated with an optical quality light reflective material. Accordingly, the cost of materials and the cost to form the mirror may be substantially less than the corresponding cost to form a suitable lens to provide a curved projection having constant displayed pixel pitch or constant angular separation among adjacent image pixels. Moreover, the time required to manufacture the curved mirror may be greatly reduced as compared to that required to manufacture a hemispherical optical projection lens.

Time and expense may also be reduced in determining the appropriate configuration of the curved reflecting surface (e.g., the curved reflecting surface) 152 as compared to a hemispherical optical projection lens. As discussed above, the proper shape of the reflecting surface can be determined computationally (e.g., using computer software). By comparison, a suitable lens system may require substantially more time and a skilled optical designer. Accordingly, the time and skill required to design the curved mirror may be substantially less than that required to design a suitable lens.

Curved mirror systems according to embodiments of the present invention can be employed with projector units such as conventional and commercially available projectors (e.g., LCD projectors) that are adapted to project onto a flat (i.e., planar) screen. The mirror systems of the present invention can be used with such projectors without requiring spatial distortion correction of the image to be projected. According to some embodiments, the curved mirror (e.g., the curved mirror 150) is positioned externally of the projector (e.g., the projector 121) so that a given curved mirror can be used with a number of different projectors (including projectors from different vendors) without necessitating redesign or customization of the curved mirror. Rather, it may only be necessary to properly place the primary projection (e.g., the primary projection 160) on the curved mirror (e.g., the curved mirror 150) utilizing the focus and zoom adjustment apparatus typically provided on such projectors.

Optical projection systems according to embodiments of the invention may accommodate projector configurations that hemispherical optical projection lens systems or other lens systems cannot accommodate or can accommodate only with substantial difficulty. For example, many commercially available projectors, which are intended to project onto a flat screen from a support, permanently mount the lens thereof off-center of the source of the array of image pixels 126 to perform an operation known as "key stoning". The purpose of this configuration is to allow a projector placed on a support (e.g., a conference room table) to fill the screen forward and above the lens centerline noting that if the lens were center mounted, much of the image would be projected into the table and therefore never reach the screen. Because of the curved mirror of the present invention can be placed outside of the projector, the relative placement of the projector and the curved mirror can be selected or adjusted to enable projectors, such as some permanently key stoned DLP projectors, to be used in optical projector systems according to the present invention. Thus, optical projection systems according to embodiments of the present invention can accommodate projector units that mechanically do not allow for an on-center lens such as a hemispherical lens.

In accordance with embodiments of the present invention, the curved mirror (e.g., the curved mirror 150) can be placed out of the line of sight between the viewer Z and the display surface 114. In particular, the mirror 150 can be placed off-axis from the center axis C-C of the display surface 114. Moreover, in accordance with some embodiments, the mirror 150 can be placed off-axis in two planes. The mirror 150 can be adapted to enhance or optimize the projection 162 to account for the location of the viewer (i.e., can compensate for off-axis viewer line of sight). Thus, optical projection systems according to embodiments of the invention can accommodate terminal optics locations and configurations that are physically not possible with a lens such as a hemispherical lens.

According to some embodiments and as illustrated, the terminal mirror 150 is located outside of a sight volume defined by the periphery of the display surface 114 (i.e., the periphery defined by the edges 114A, 114B, 114C, 114D) and the center axis C-C. That is, the sight volume is bounded by the periphery in all directions except in directions parallel to the center axis C-C. According to some embodiments, the center axis C-C is horizontal and the terminal mirror 150 is located vertically above the top edge 114C or vertically below the bottom edge 114D. According to some embodiments, the center axis C-C is horizontal and the terminal mirror 150 is located laterally to the left of the side edge 114A or laterally to the right of the side edge 114B.

As discussed above, in accordance with some embodiments of the present invention, the display surface 114 may be an ellipsoid (e.g., a hemisphere) which is truncated on the top, bottom, left and right sides to form a display surface 114 as shown in FIG. 1. This configuration may be particularly well adapted for high aspect ratio images such as images formatted in a 16:9 aspect ratio, which is commonly employed for high definition (HD) images. Moreover, where the projector and the mirror are configured to be fully out of the viewer's line of sight of the display surface 114, a wide range of individual and group viewing configurations may be enabled.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An optical projection system for use with a display surface, the optical projection system comprising:
   at least one image source comprising an array of source image pixels;
   a projector to project a first projection of the array of source image pixels; and
   at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels;
   wherein the at least one curved reflecting surface includes a reflecting surface having an asymmetric smooth profile.

2. The optical projection system of claim 1 wherein the curved second projection is a truncated ellipsoidal projection.

3. The optical projection system of claim 2 wherein the curved second projection is a truncated spherical projection.

4. The optical projection system of claim 1 wherein the curved second projection is a truncated cylindrical projection.

5. The optical projection system of claim 1 further including a display structure having a display surface, wherein the optical projection system is adapted to project the second projection onto the display surface.

6. The optical projection system of claim 1 wherein the display surface has a curved profile.

7. The optical projection system of claim 6 wherein the display surface is truncated ellipsoidally shaped.

8. The optical projection system of claim 7 wherein the truncated ellipsoidally shaped display surface has the shape of an ellipsoid that is truncated on at least first and second opposed sides.

9. The optical projection system of claim 7 wherein the display surface has a center axis and the at least one mirror includes a terminal mirror having a terminal curved reflecting surface, wherein the terminal curved reflecting surface is offset from the center axis.

10. The optical projection system of claim 9 wherein the display surface has a periphery and the terminal mirror is located outside of a sight volume bounded by the periphery in all directions except in directions parallel to the center axis.

11. The optical projection system of claim 1 wherein the at least one mirror includes a mirror body and a light reflective coating on the mirror body forming a curved reflective surface of the at least one mirror.

12. The optical projection system of claim 1 wherein the curved second projection has a negative focus.

13. The optical projection system of claim 1 wherein the at least one mirror includes at least two mirrors in series.

14. The optical projection system of claim 13 wherein the at least one mirror includes a first, flat mirror and a second, curved mirror in series.

15. The optical projection system of claim 13 wherein the at least one mirror includes a plurality of curved mirrors in series.

16. The optical projection system of claim 1 wherein, in the array of displayed image pixels:
   the array of displayed image pixels have a first constant pixel pitch among adjacent image displayed pixels along a first axis and a second constant pixel pitch among adjacent image displayed pixels along a second axis transverse to the first axis; and
   the first pixel pitch is different from the second pixel pitch.

17. The optical projection system of claim 1 wherein the at least one curved reflecting surface is adapted to convert the first projection to the curved second projection such that the array of displayed image pixels are distributed on the display surface such that reference rays each cast from a defined common reference point to a center of a respective one of the displayed pixels will have constant angular separation between adjacent said reference rays.

18. The optical projection system of claim 1 wherein the first image projection is provided without requiring spatial distortion correction of the array of source image pixels.

19. The optical projection system of claim 18 wherein:
the display surface has a center axis;
the at least one mirror includes a terminal mirror having a terminal curved reflecting surface;
the terminal curved reflecting surface is offset from the center axis; and
the display surface has a periphery and the terminal mirror is located outside of a sight volume bounded by the periphery in all directions except in directions parallel to the center axis.

20. An optical projection system for use with a display surface, the optical projection system comprising:
at least one image source comprising an array of source image pixels;
a projector to project a first projection of the array of source image pixels; and
at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels;
wherein the display surface has a center axis and the at least one mirror includes a terminal mirror having a terminal curved reflecting surface, wherein the terminal curved reflecting surface is offset from the center axis.

21. The optical projection system of claim 20 wherein the display surface has a curved profile.

22. The optical projection system of claim 21 wherein:
the display surface is truncated ellipsoidally shaped; and
the truncated ellipsoidally shaped display surface has the shape of an ellipsoid that is truncated on at least first and second opposed sides.

23. The optical projection system of claim 20 wherein the display surface has a periphery and the terminal mirror is located outside of a sight volume bounded by the periphery in all directions except in directions parallel to the center axis.

24. An optical projection system for use with a display surface, the optical projection system comprising:
at least one image source comprising an array of source image pixels;
a projector to project a first projection of the array of source image pixels; and
at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels;
wherein the curved second projection is a truncated cylindrical projection.

25. An optical projection system for use with a display surface, the optical projection system comprising:
at least one image source comprising an array of source image pixels;
a projector to project a first projection of the array of source image pixels; and
at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels;
wherein the at least one mirror includes at least two mirrors in series.

26. The optical projection system of claim 25 wherein the at least one mirror includes a first, flat mirror and a second, curved mirror in series.

27. The optical projection system of claim 25 wherein the at least one minor includes a plurality of curved mirrors in series.

28. An optical projection system for use with a display surface, the optical projection system comprising:
at least one image source comprising an array of source image pixels;
a projector to project a first projection of the array of source image pixels; and
at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels have constant pixel pitch among adjacent displayed image pixels; and
wherein the first image projection is provided without requiring spatial distortion correction of the array of source image pixels; and
wherein:
the display surface has a center axis;
the at least one mirror includes a terminal mirror having a terminal curved reflecting surface;
the terminal curved reflecting surface is offset from the center axis; and
the display surface has a periphery and the teiminal mirror is located outside of a sight volume bounded by the periphery in all directions except in directions parallel to the center axis.

29. An optical projection system for use with a display surface, the optical projection system comprising:
at least one image source comprising an array of source image pixels;
a projector to project a first projection of the array of source image pixels; and
at least one mirror including at least one curved reflecting surface having a curved profile, wherein the at least one curved reflecting surface is adapted to convert the first projection to a curved second projection directed onto the display surface to provide an array of displayed image pixels on the display surface corresponding to the array of source image pixels, wherein the array of displayed image pixels are distributed on the display surface such that reference rays each cast from a defined common reference point to a center of a respective one of the displayed pixels will have constant angular separation between adjacent said reference rays;

wherein the first image projection is provided without requiring spatial distortion correction of the array of source image pixels; and wherein:

the display surface has a center axis;

the at least one mirror includes a terminal mirror having a terminal curved reflecting surface;

the terminal curved reflecting surface is offset from the center axis; and the display surface has a periphery and the terminal mirror is located outside of a sight volume bounded by the periphery in all directions except in directions parallel to the center axis.

* * * * *

UNITED STATES PATENT AND TRADEMARK OFFICE
CERTIFICATE OF CORRECTION

| | | |
|---|---|---|
| PATENT NO. | : 7,766,483 B2 | Page 1 of 1 |
| APPLICATION NO. | : 11/398228 | |
| DATED | : August 3, 2010 | |
| INVENTOR(S) | : Balu et al. | |

It is certified that error appears in the above-identified patent and that said Letters Patent is hereby corrected as shown below:

Column 14, Claim 27, Line 21: Please correct "one minor" to read -- one-mirror --
                Claim 28, Line 56: Please correct "teiminal" to read -- terminal --

Signed and Sealed this
Twenty-fifth Day of January, 2011

David J. Kappos
*Director of the United States Patent and Trademark Office*